Feb. 15, 1927.
B. M. BOND
ANIMAL TRAP
Filed Jan. 26, 1925
1,617,987
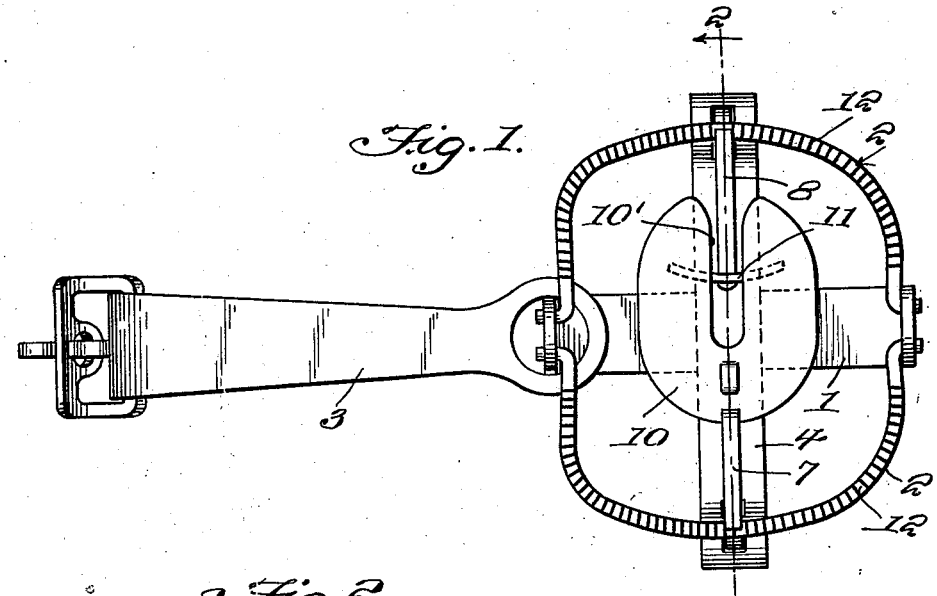
Fig. 1.
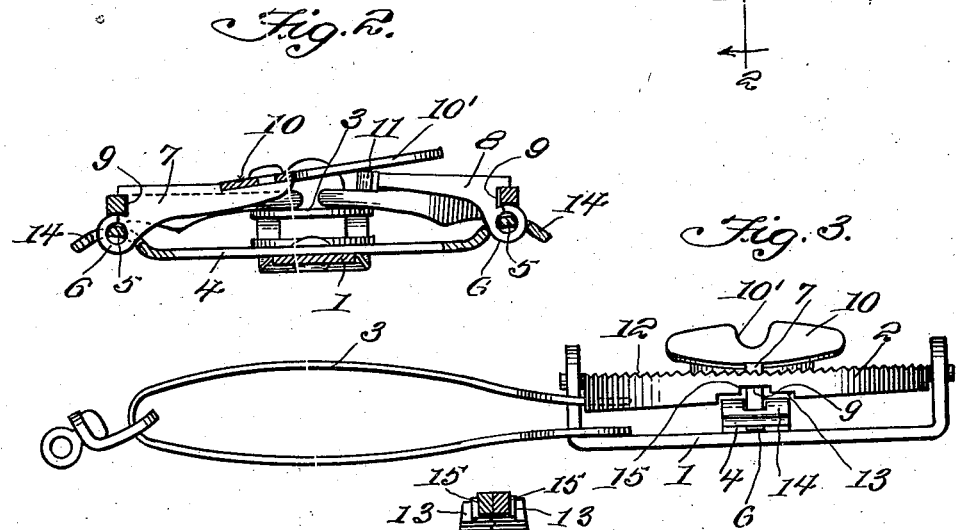
Fig. 2.
Fig. 3.
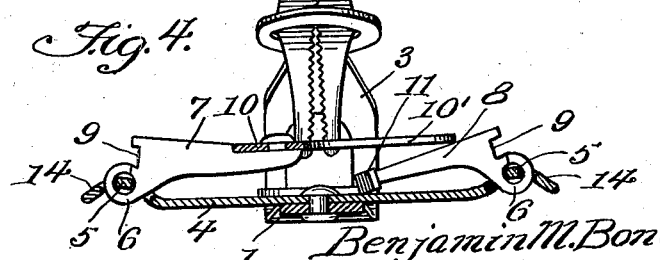
Fig. 4.
Benjamin M. Bond INVENTOR
BY Victor J. Evans ATTORNEY
WITNESS: J.T.L. Wright Patented Feb. 15, 1927.

1,617,987

UNITED STATES PATENT OFFICE.

BENJAMIN M. BOND, OF GREENWOOD, WEST VIRGINIA.

ANIMAL TRAP.

Application filed January 26, 1925. Serial No. 4,857.

My invention relates to the construction of steel animal traps, and has for its object to simplify and improve the existing art by producing means for latching both of the jaws of a trap in open position in a manner which will not interfere with the free springing of the jaws nor the sensitiveness in the depression of the pan.

A further object is the provision in a spring jaw animal trap, of a novel means for latching both of the jaws in fully open position, whereby a greater compression will be imparted to the operating spring to insure the actuation thereof in springing the jaws to closed position.

A further object is to provide a spring jaw trap with a novel construction of pans whereby bait may be easily and effectively sustained thereon.

To the attainment of the foregoing and other objects which will appear as the nature of the invention is better understood, reference is to be had to the drawing which accompanies and which forms part of this application.

In the drawing:—

Figure 1 is a plan view of the trap in open position.

Figure 2 is a sectional view on the line 2—2 of Figure 1.

Figure 3 is a side elevation.

Figure 4 is a sectional view substantially similar to Figure 2, but showing the trap sprung.

The base plate 1 of the trap is of the usual construction, having upset ends in which are pivoted trunnions on the ends of the jaws 2. The jaws are influenced by a two-armed actuating spring 3 in the usual manner.

The numeral 4 designates the cross bar which forms one of the features of my invention. The cross bar is centrally riveted to the base 1 and extends laterally therefrom. The cross bar, adjacent to its ends, is rounded upwardly and the sides of the said rounded portions are cut away to provide transverse pivot bars 5 for the eyes 6 of shanks 7 and 8 of trigger members. The outer end of each shank, above the eye 6 thereof, is notched as at 9 and the shank 7 carries a pan 10. The inner end of the shank 8 is formed with a lateral flange 11 designed to underlie the pan 10 when the trap is set.

The pan 10 is of a particular and peculiar construction, the same comprising an elongated member whose ends are rounded. The pan, at the end thereof opposite that to which the trigger shank 7 is fixed, is formed with a central longitudinally arranged slot or opening 10', the side walls provided thereby being rounded outwardly to provide a flared entrance for the opening. The opening permits of the arrangement of bait on the pan without necessitating the tying of the said bait, the edges provided by the opening forming jaws to engage the compressed portion of the bait. The pan is also of a size to receive thereon seed, when the trap is to be used for trapping birds.

The jaws 2 have their active edges serrated, as at 12, and the outer faces of the jaws, on their lower edges are provided with elongated slots 13 of a size to snugly receive therein the upwardly rounded or bowed portions 14 on the ends of the base plate 1. The inner walls provided by the slots are notched, as at 15, so that the portion of the jaws between the notches and the roughened or serrated active edges thereof approximately equal the depth of the notches 9 in the shanks of the trigger members 7 and 8. These notches engage the said portions of the jaws when the trap is set.

With my construction it will be noted that I have provided a double trigger for the trap which effectively holds the same in set condition. The notches 9 are formed in the trigger shanks 7 and 8 at points to engage the jaws when the latter are in horizontal position so that the spring 3 is compressed to a greater extent than is ordinary, and consequently has more power in forcing the jaws closed and in holding the said jaws in such condition. By reference to Figure 1 of the drawings it will be seen that the shank 8 is arranged directly below and centrally of the bait receiving slot 10' in the pan 10, and that the lateral flange 11 on the outer end of the said shank 8 bridges the slot and has its ends disposed below the pan. By this arrangement the bait in the slot cannot be pulled longitudinally therethrough. Also by this arrangement a pressure on the pan will not only release the trigger 7 but will likewise move the trigger 8 to release position.

It is believed that the foregoing description, when taken in connection with the drawing will fully set forth the simplicity and advantages of my improvement to those skilled in the art to which such inventions relate, the right being reserved, however, to make such changes therefrom as fairly fall within the scope of what I claim.

Having described the invention, I claim:—

A spring jaw trap including pivotally supported shanks having notches above their pivots to receive the jaws of the trap therein when the said jaws are moved to open position, a pan carried by and extending from the inner end of one of the shanks, said pan having a bait receiving slot entering from its outer end, the second shank being disposed in a line centrally with respect to the slot in the pan, and a laterally extending member on the outer end of the last mentioned shank bridging the slot and underlying the pan.

In testimony whereof I affix my signature.

BENJAMIN M. BOND.